(12) United States Patent
Blackburn

(10) Patent No.: US 10,421,508 B2
(45) Date of Patent: Sep. 24, 2019

(54) DETACHABLE TRACTION SYSTEM FOR ENDLESS TRACK VEHICLES

(71) Applicant: Brad Blackburn, Kamloops (CA)

(72) Inventor: Brad Blackburn, Kamloops (CA)

( * ) Notice: Subject to any disclaimer, the term of this patent is extended or adjusted under 35 U.S.C. 154(b) by 123 days.

(21) Appl. No.: 15/544,866

(22) PCT Filed: Aug. 13, 2015

(86) PCT No.: PCT/CA2015/050773
§ 371 (c)(1),
(2) Date: Jul. 19, 2017

(87) PCT Pub. No.: WO2016/123687
PCT Pub. Date: Aug. 11, 2016

(65) Prior Publication Data
US 2018/0015971 A1 Jan. 18, 2018

(30) Foreign Application Priority Data
Feb. 4, 2015 (CA) ..................................... 2881247

(51) Int. Cl.
*B62D 55/28* (2006.01)
*B62D 55/24* (2006.01)

(52) U.S. Cl.
CPC ............. *B62D 55/28* (2013.01); *B62D 55/24* (2013.01); *B62D 55/286* (2013.01)

(58) Field of Classification Search
CPC ....... B62D 55/28; B62D 55/286; B62D 55/24
See application file for complete search history.

(56) References Cited

U.S. PATENT DOCUMENTS 2,064,890 A * 12/1936 Dorst ..................... B62D 55/24
305/180
3,558,198 A * 1/1971 Tomita ................... B62D 55/24
305/180

(Continued)

FOREIGN PATENT DOCUMENTS

RU 2006409 1/1994
SU 1452741 1/1989

OTHER PUBLICATIONS

International Searching Authority, The International Search Report and the Written Opinion of the International Searching Authority, or the Declaration, International Application No. PCT/CA2015/050773, Filed Aug. 13, 2015, 2 pages, Receiving Office—Canadian Intellectual Property Office.

*Primary Examiner* — Kip T Kotter
(74) *Attorney, Agent, or Firm* — Richard D. Okimaw

(57) ABSTRACT

The invention provides a detachable traction system for track vehicles comprising a multiplicity of gripping bars each of which is bolted through a tread of a corresponding multiplicity of treads on each track of an endless track vehicle. The ice traction components include gripping bars each having a gripping surface comprising a patch of durable rough protrusive material. The mud or snow traction components include gripping bars each having a compression trough. In combination with the gripping bars being angled across their respective treads toward ensuring stability of steering and direction of travel of the vehicle, the tapering of the compression troughs reduces or eliminates clogging of the compression bars with mud or snow during travel thereby increasing performance through snowy, slushy, or semi-liquid terrain.

19 Claims, 15 Drawing Sheets

(56) References Cited

U.S. PATENT DOCUMENTS

| | | | | |
|---|---|---|---|---|
| 3,765,731 | A * | 10/1973 | Kilbane, Jr. | B62D 55/28 |
| | | | | 305/160 |
| 3,782,787 | A * | 1/1974 | Rubel | B62D 55/244 |
| | | | | 305/180 |
| 3,802,751 | A | 4/1974 | Beyers | |
| 3,838,894 | A | 10/1974 | Reedy | |
| 4,010,789 | A * | 3/1977 | Vidakovic | B60C 27/20 |
| | | | | 152/182 |
| 4,750,792 | A | 6/1988 | Caron | |
| 4,795,221 | A * | 1/1989 | Simmons | B62D 55/24 |
| | | | | 305/165 |
| 5,033,801 | A * | 7/1991 | Beeley | B62D 55/202 |
| | | | | 305/165 |
| 5,690,398 | A * | 11/1997 | Pribyl | B60C 27/16 |
| | | | | 305/162 |
| 6,540,310 | B1 | 4/2003 | Cartwright | |
| 2005/0269878 | A1 | 12/2005 | Lefgren | |
| 2008/0136254 | A1 * | 6/2008 | Jacobsen | B62D 55/27 |
| | | | | 305/165 |
| 2010/0096917 | A1 * | 4/2010 | Bair | B62D 55/24 |
| | | | | 305/180 |
| 2012/0007421 | A1 * | 1/2012 | Meulemans | B62D 55/286 |
| | | | | 305/187 |
| 2013/0090045 | A1 * | 4/2013 | Meyer | B24B 23/028 |
| | | | | 451/359 |
| 2015/0217817 | A1 * | 8/2015 | Delisle | B62D 55/244 |
| | | | | 305/180 |

* cited by examiner

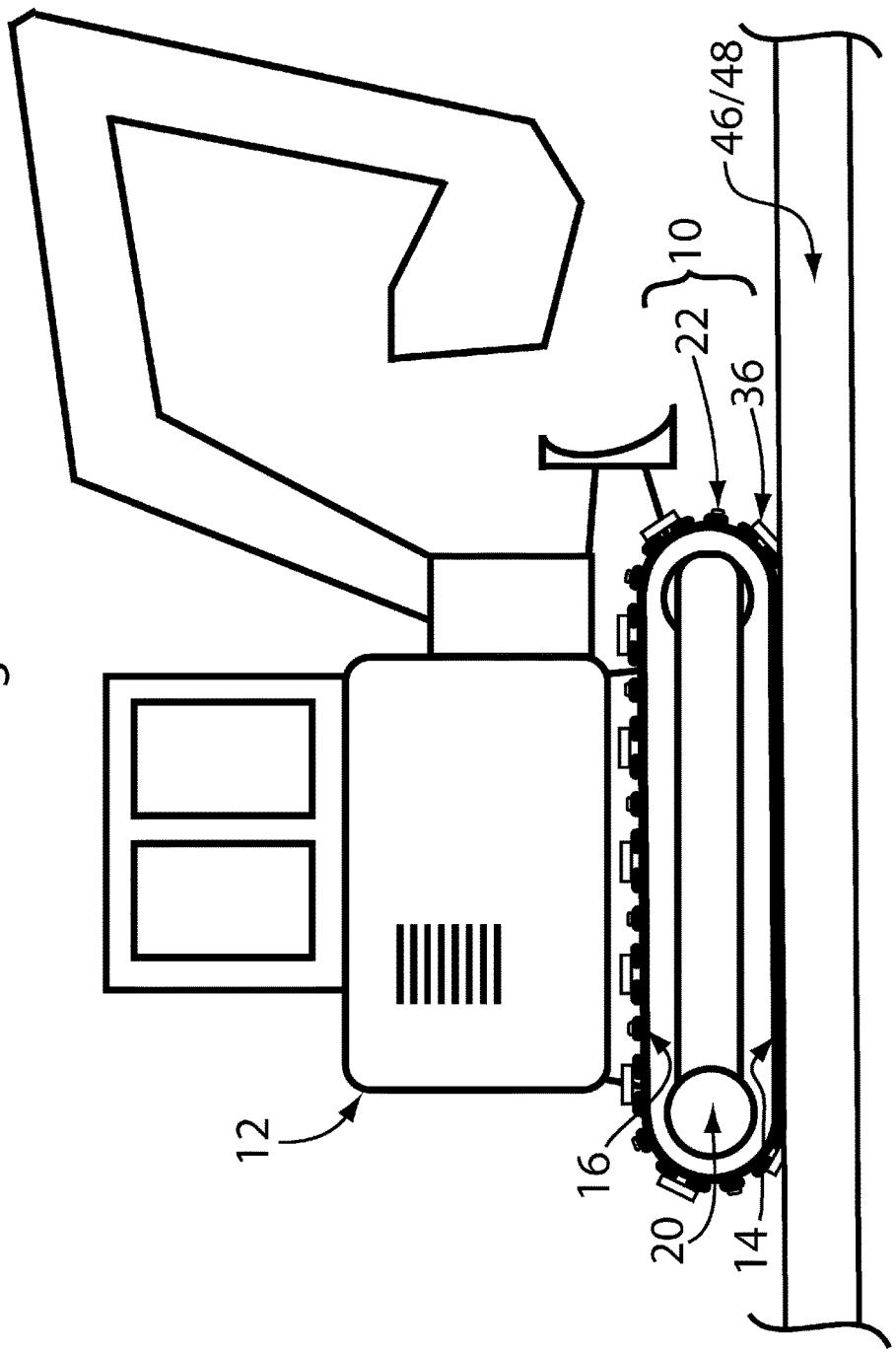

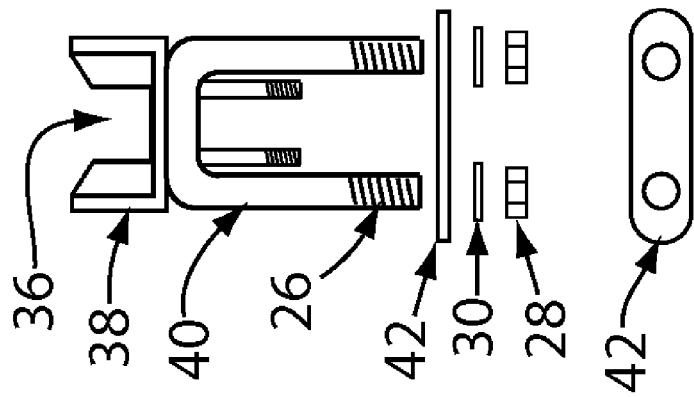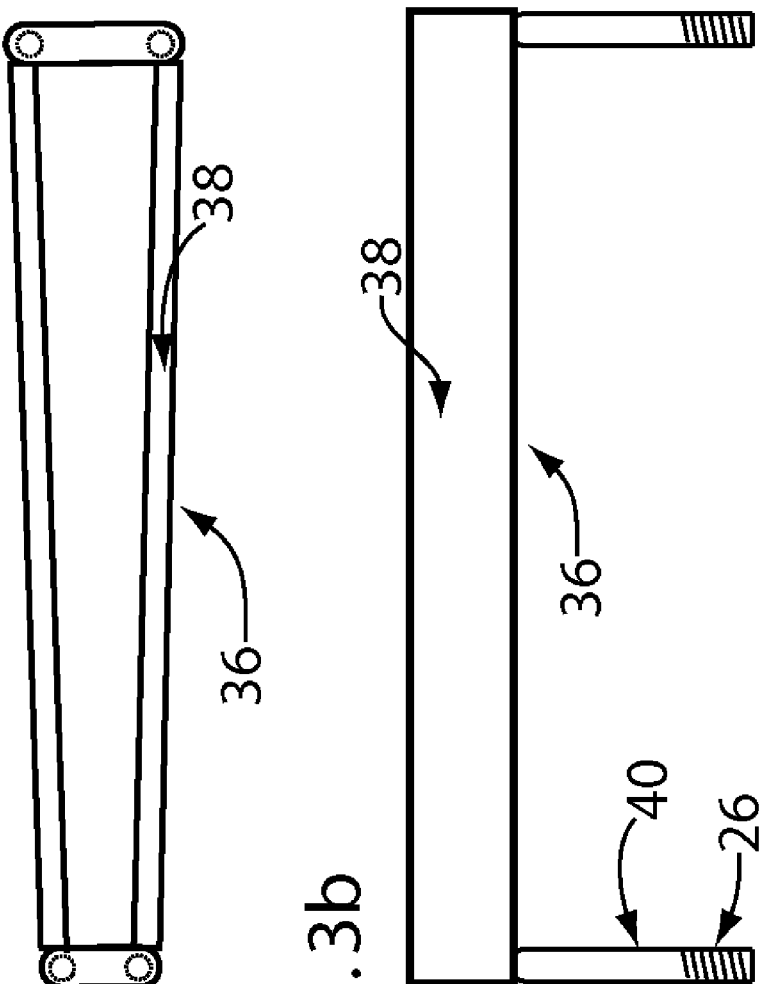

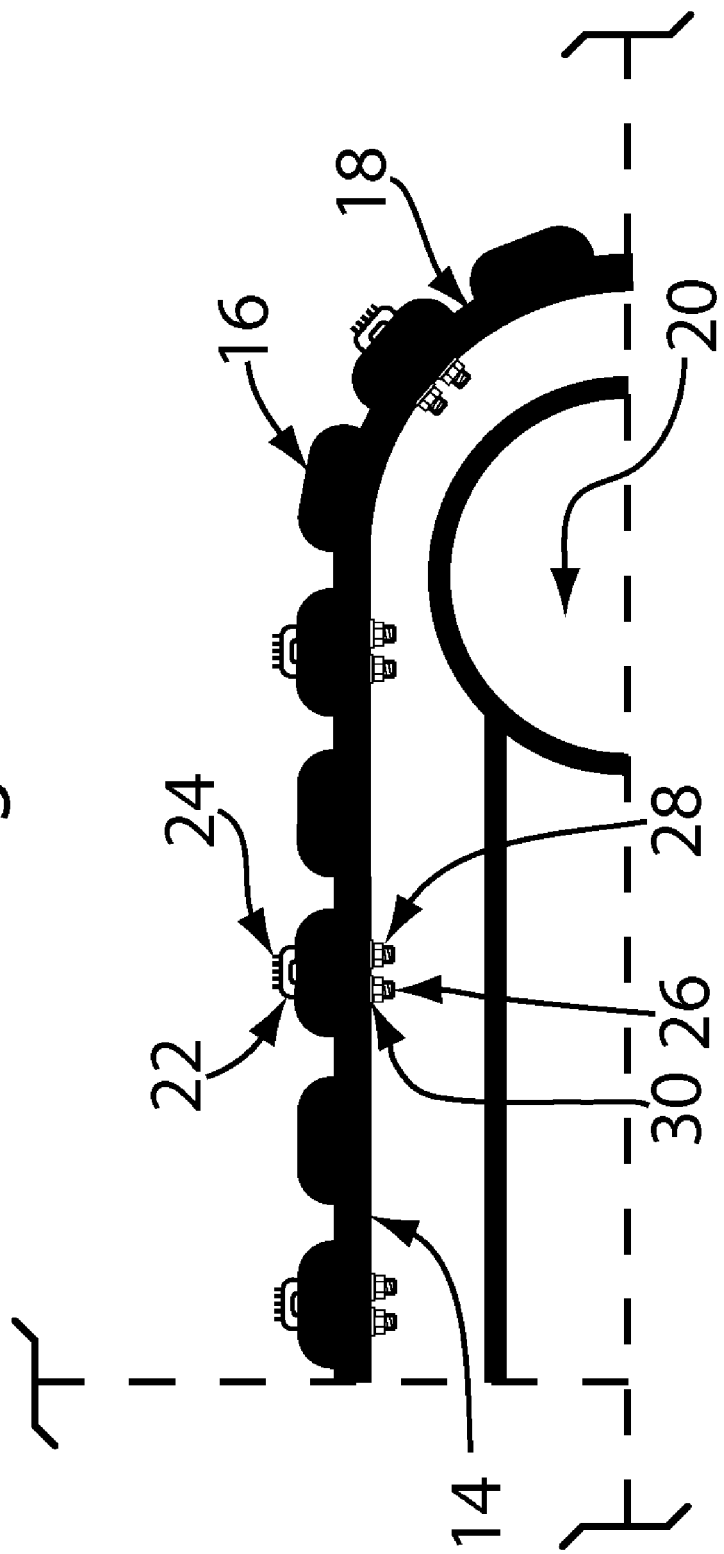

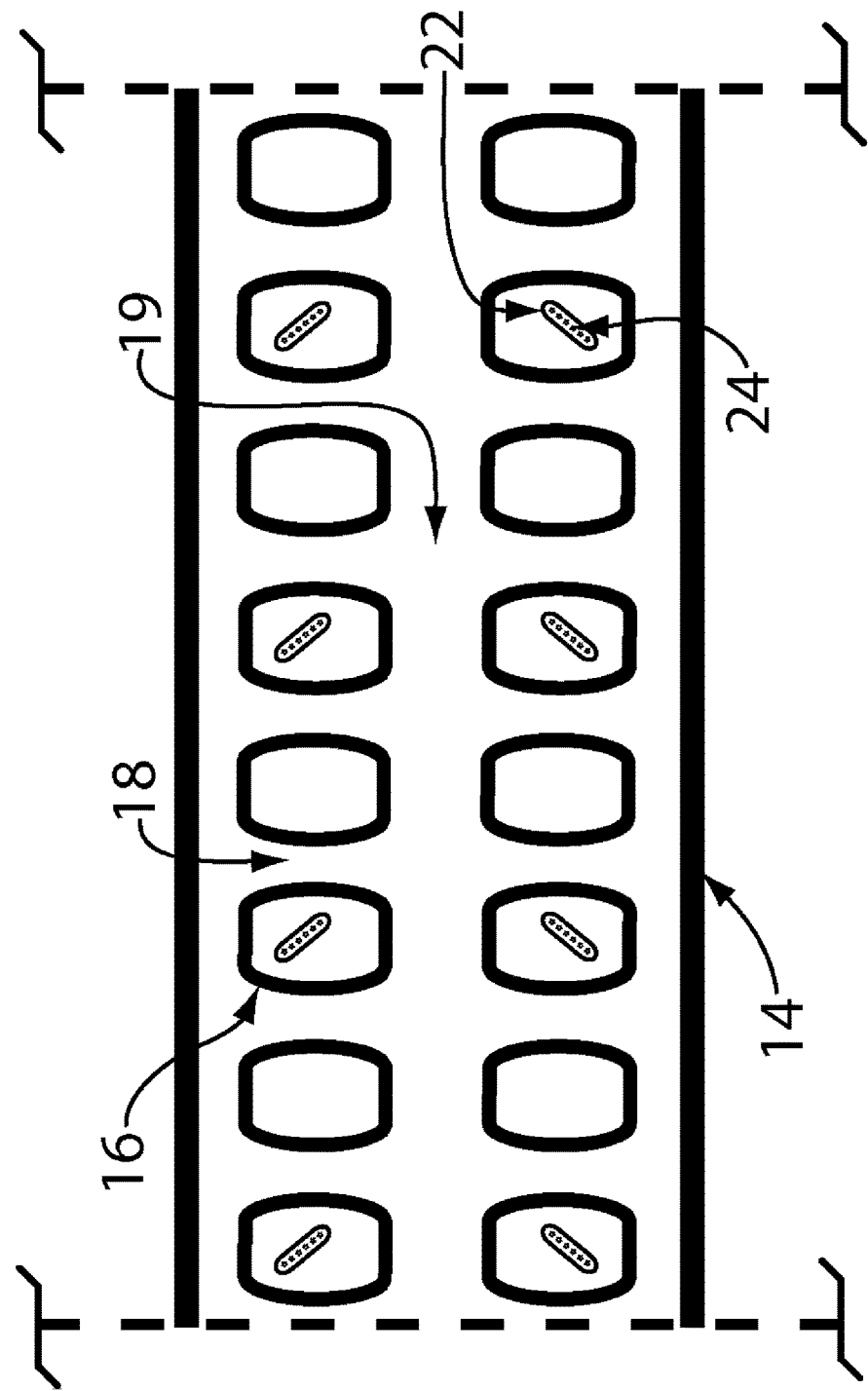

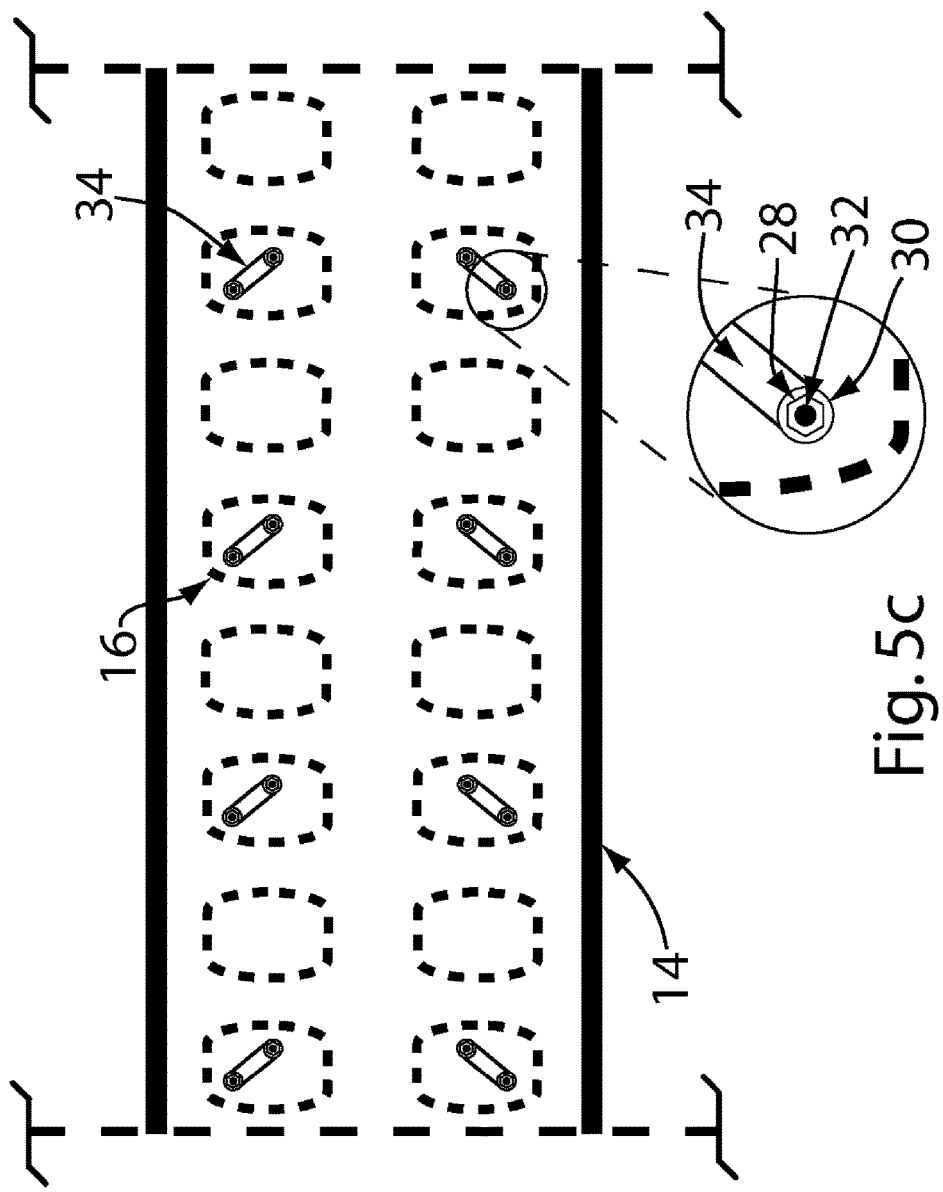

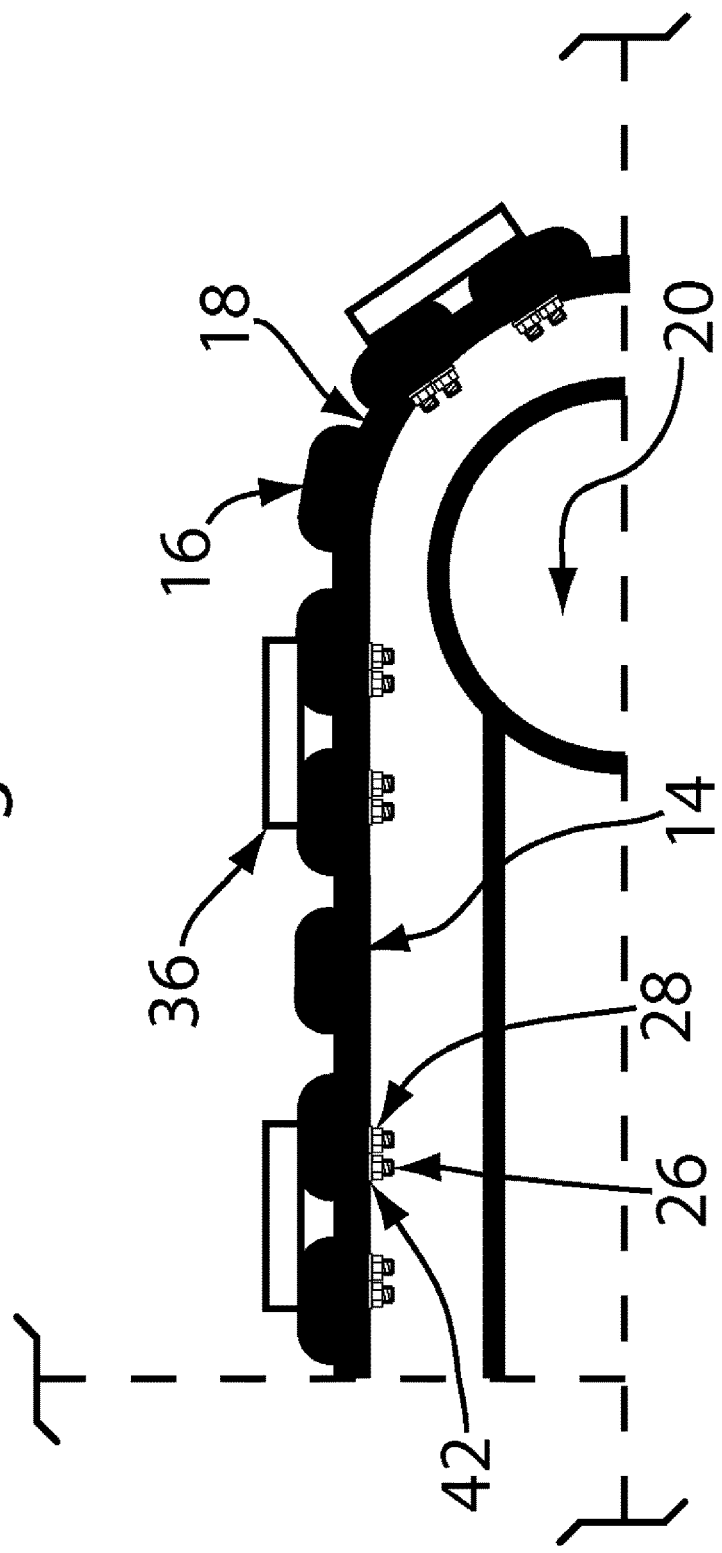

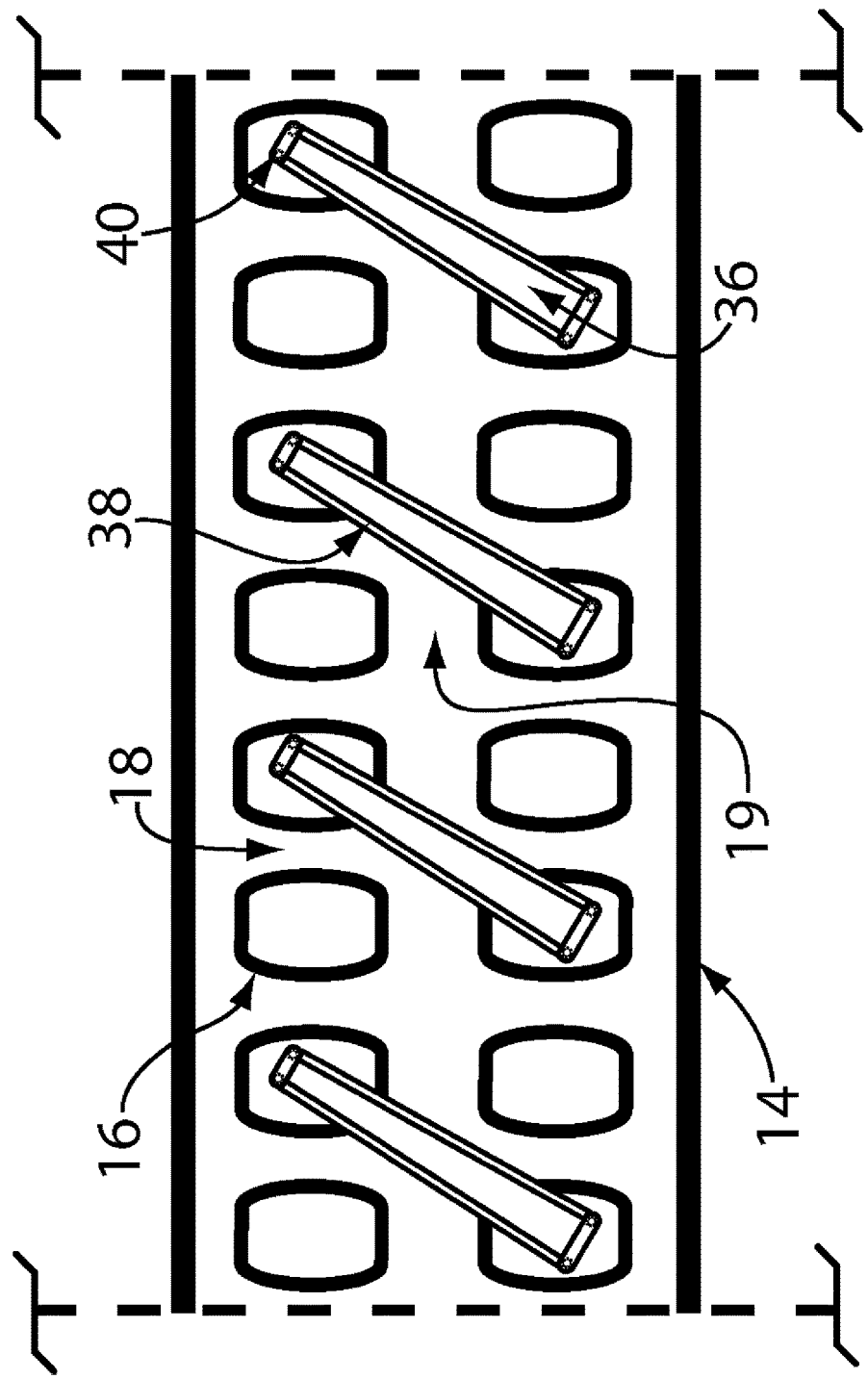

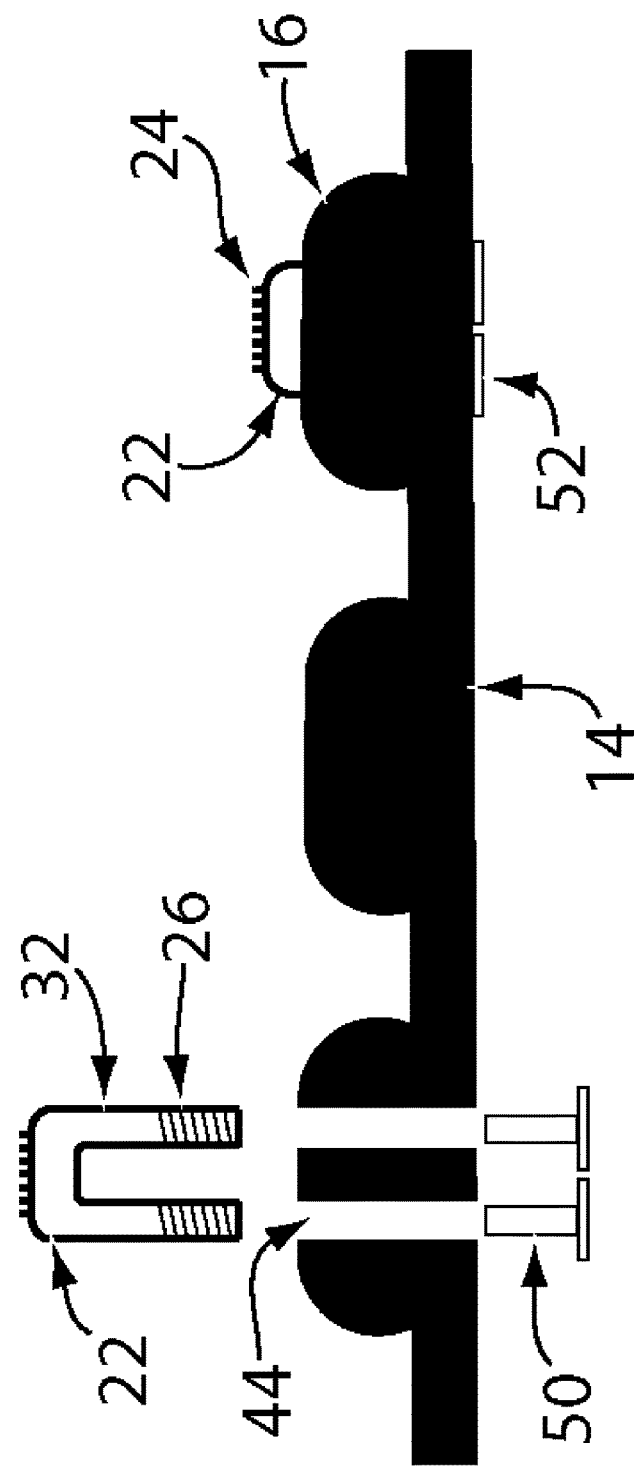

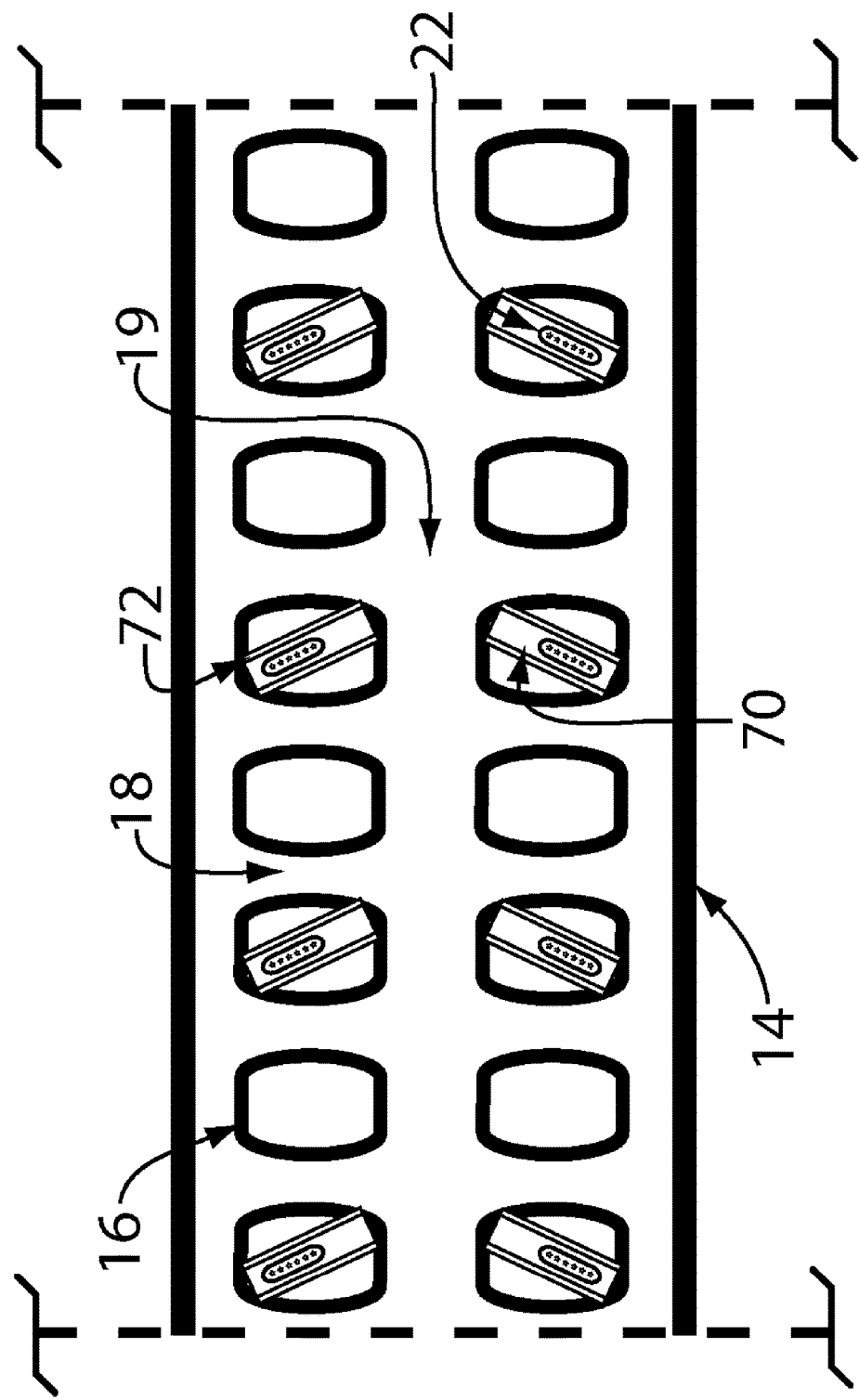

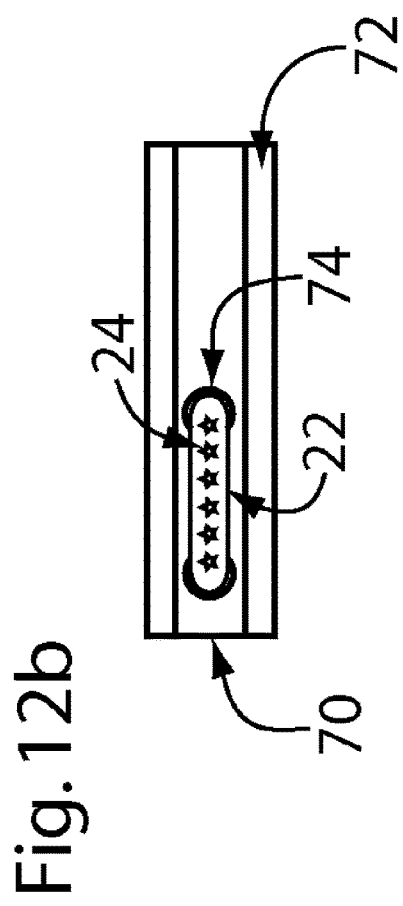
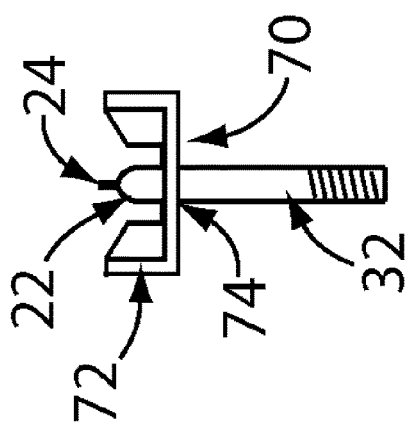
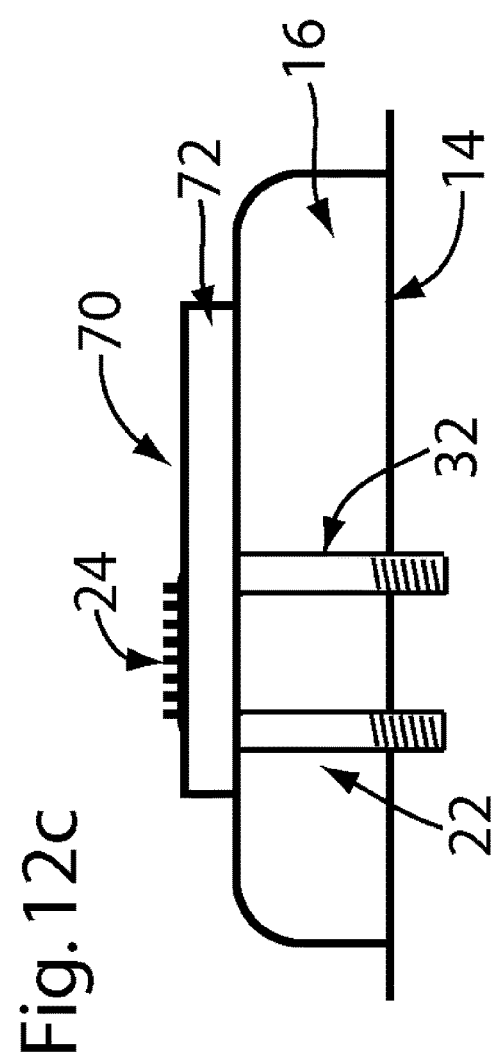

DETACHABLE TRACTION SYSTEM FOR ENDLESS TRACK VEHICLES

FIELD OF INVENTION

This invention relates to a novel device in the general field of traction improvements for flexible or endless tracked vehicles, and more specifically to a detachable traction system that ensures stable and efficient travel over slippery ice/snow and deep rut-forming slush/mud surfaces.

BACKGROUND OF THE INVENTION

The known prior art will now be discussed and critiqued. Three general categories of traction devices are known to be used with tracked vehicles; namely studs or detachable chains for ice/snow, and detachable bars for mud/slush.

Studs, as demonstrated in U.S. Pat. No. 7,845,741, are often embedded into the rubber material of a track, protruding into the slippery surface. Unfortunately, studs are often not removable, and if they are torn free from the track, the damage created can entail replacing the entire track. Also, studs flex with the track because they are embedded into its resilient material, but they do not attach to the track as securely as they could be if they were affixed completely through the entire track.

Detachable chains, as demonstrated in U.S. Pat. No. 8,016,369, are used with specialized track designs, which enable them to be secured as shown and removed when not needed. However, chains tend to get clogged with ice/snow, tend to fall off when needed most, and often do not prevent sideways motion when traversing inclines.

Detachable bars, as demonstrated in U.S. Pat. No. 2,967,737 and U.S. Pat. No. 8,424,981, have been used to improve traction in deep slushy & muddy terrains, but they do not prevent sideways motion when traversing inclines, they can get clogged like chains, and they act more like paddles, which don't work unless you are going in a perfectly straight line.

BRIEF SUMMARY OF THE INVENTION

The Detachable Traction System for Endless Track Vehicles is designed to provide improved stability in all directions, and increased traction on both ice/snow as well as deep mud/slush, and comprises gripping bars that are bolted completely through selected treads of each track, angled to prevent sideways slippage, and with a gripping surface comprising a patch of durable rough protrusive material designed to claw into ice or hard-packed snow and ensure traction. Each component of the Detachable Traction System is detachable for each replacement of parts that become damaged, or to switch from an ice system to a snow/mud system, or from either of those to both ice and mud/snow traction.

The invention provides a detachable traction system for track vehicles comprising a multiplicity of gripping bars each of which is bolted through a tread of a corresponding multiplicity of treads on each track of an endless track vehicle. The ice traction components include gripping bars each having a gripping surface comprising a patch of durable rough protrusive material. The mud or snow traction components include gripping bars each having a compression trough. Importantly, the gripping bars having compression troughs are tapered from a narrow end mounted adjacent to an inner area of a track on the vehicle to a wider end mounted adjacent to an outer area of the track, such that mud or snow is thrown down the trough and clear of the vehicle as it moves, rather than clogging the trough and reducing the traction effect of the compression trough of the respective gripping bar. In combination with the gripping bars being angled across their respective treads toward ensuring stability of steering and direction of travel of the vehicle, the tapering of the compression troughs reduces or eliminates clogging of the compression bars with mud or snow during travel thereby increasing performance through snowy, slushy, or semi-liquid terrain.

The gripping bars are bolted completely through and across selected treads of each track. Strength and durability of the position of each gripping bar is obtained by having gripping bars that extends perpendicularly at each end thereof into bolts mounted through holes in the treads, secured therein with nuts screwed onto the bolts. In a preferred embodiment capable of providing enhanced traction in icy, snowy and muddy terrain, the system comprises a first plurality of gripping bars each have a gripping surface comprising a patch of durable rough protrusive material, and a second plurality of gripping bars each having a compression trough formed by flanges perpendicular to a bar base. Each compression trough of the second plurality of gripping bars is tapered from a narrow-trough end of a bar base of a gripping bar to a wider-trough end of the bar base of the gripping bar. The gripping bars on a first track of the vehicle are mounted at an angle to an edge of each tread of the first track, and the gripping bars on a second track of the vehicle are mounted at a mirror-image angle to an edge of each tread on the second track. The gripping bars each having a gripping surface comprising a patch of durable rough protrusive material alternate with gripping bars each having a compression trough, forming a pattern of gripping bars mounted to each track of the vehicle. The gripping bars having compression troughs each extend perpendicularly into a pair of bolts at each end of a bar base of the respective gripping bar, each such bolt being mounted through holes in the treads and secured therein with nuts screwed onto the bolts. The system provides an effective and durable traction system as each gripping bar is clamped across and through its respective tread, distributing forces exerted on each gripping bar across the tread as the vehicle travels in rough and slippery terrain.

The Detachable Traction System allows the operator of a tracked vehicle to select the appropriate traction element to match the terrain conditions, gripping bars for ice/hard snow, and compression troughs for slush/mud, or both for mixed conditions. The angled traction elements ensure sideways stability when navigating uneven or inclined terrain. The securement means ensures that the traction systems will not damage the track by ripping free, which ensures consistent traction when needed.

BRIEF DESCRIPTION OF THE DRAWINGS

FIG. 1 shows a Side view of an Endless Tracked Vehicle with Gripping bar and Compression Trough aspects of the Detachable Traction System.

FIG. 3a shows a Top view of a Compression Trough; FIG. 3b a Side view; FIG. 3c an End view with attachment hardware; and FIG. 3d a Facing view of a Trough Plate.

FIG. 4 shows a Side view of a right side track section with Gripping bars installed.

FIG. 5a shows a Top view of a Track section with Gripping bars installed, FIG. 5b shows a Bottom view of a Track section with cleat attachment hardware, and FIG. 5c shows a Closeup view of said hardware.

FIG. 6 shows a Side view of a Track section with Compression Troughs installed. FIG. 7a shows a Top view of a right side Track section with angled Compression Troughs.

DETAILED DESCRIPTION

Figure 2A:
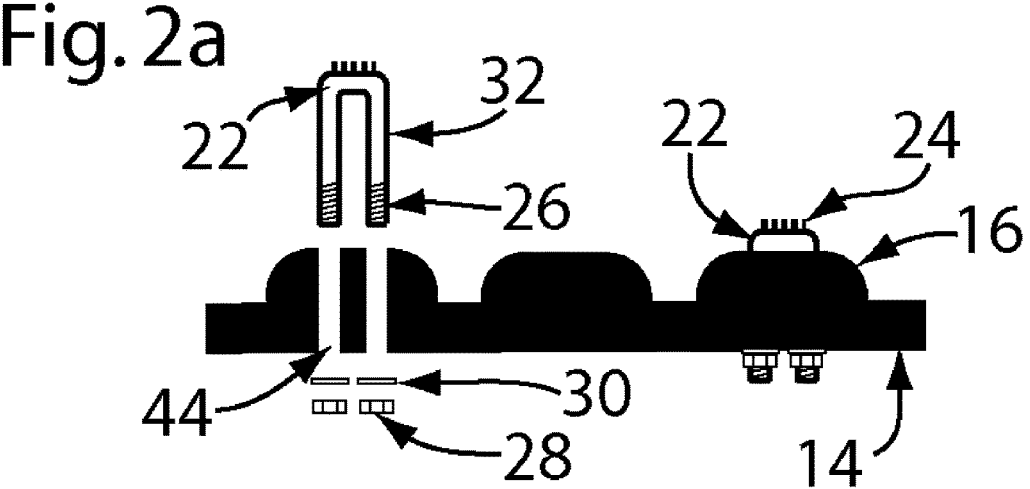
FIG. 2a shows a Side closeup view of a right side track portion with an angled gripping bar being installed.

Drawing elements will now be introduced by reference to figures, then how each element functions and interacts with each other element will be described where necessary.

FIG. 1 shows a side view of an endless tracked vehicle 12 with gripping bar 22 and compression trough 36 aspects of the detachable traction system 10, which are attached to treads 16 of the track 14 which is rotated by the drive assembly 20, enabling stable traction through low-friction 46 and semi-liquid 48 terrains.

Figure 2B:
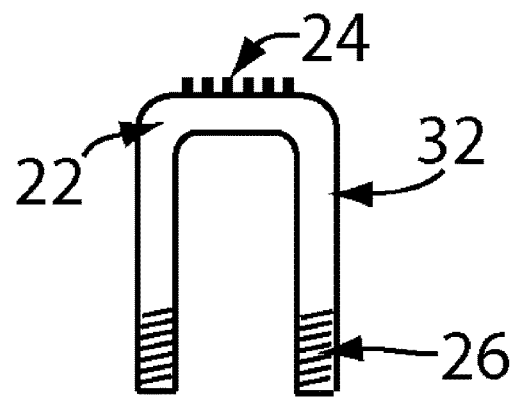
FIG. 2b shows a Facing view of an Gripping Bar, where
Figure 2C:
FIG. 2c shows a Top view of same with its protrusive surfacing.

FIG. 2a shows a side closeup view of a right side track 14 portion with an angled gripping bar 22 installed through mounting holes 44 in a tread 16, and secured by nut 28 and washer 30 to its threading 26. FIG. 2b shows a facing view of an gripping bar 22 with its protrusive surfacing 24, and FIG. 2c shows a top view of same.

FIG. 3a shows a top view of a compression trough 36 with its non-parallel flanges 38. FIG. 3b shows a side view of a compression trough 36 with its trough bolts 40 and threading 26. FIG. 3c shows an end view of a compression trough 36 with its tapering flanges 38, trough bolts 40, threading 26, trough plate 42, washers 30 and nuts 28. FIG. 3d shows a facing view of a trough plate 42.

FIG. 4 shows a side view of a right side track 14 section with angled gripping bars 22 installed through selected treads 16 and secured to the threaded ends 26 by nuts 28 and washers 30. Optionally, one may use a cleat plate 34, which uses the same outline as a trough plate 42, in place of washers 30.

FIG. 5a shows a top view of a track 14 section with gripping bars 22 installed on an angle through selected treads 16 separated by tread gaps 18, and on both sides of the track gap as shown. FIG. 5b shows a bottom view of the same track 14 section with corresponding cleat attachment hardware, with FIG. 5c showing a closeup view of said hardware, namely nuts 28, and washer 30 or optional cleat plate 34 secured to each cleat bolt 32. Hatched lines represent treads 16 from topside of track 14.

FIG. 6 shows a side view of a right side track 14 section with angled compression troughs 36 installed through selected treads 16 and secured to threading 26 of trough bolts 40 (see FIG. 3c) by nuts 28 and trough plate 42.

Figure 7B:
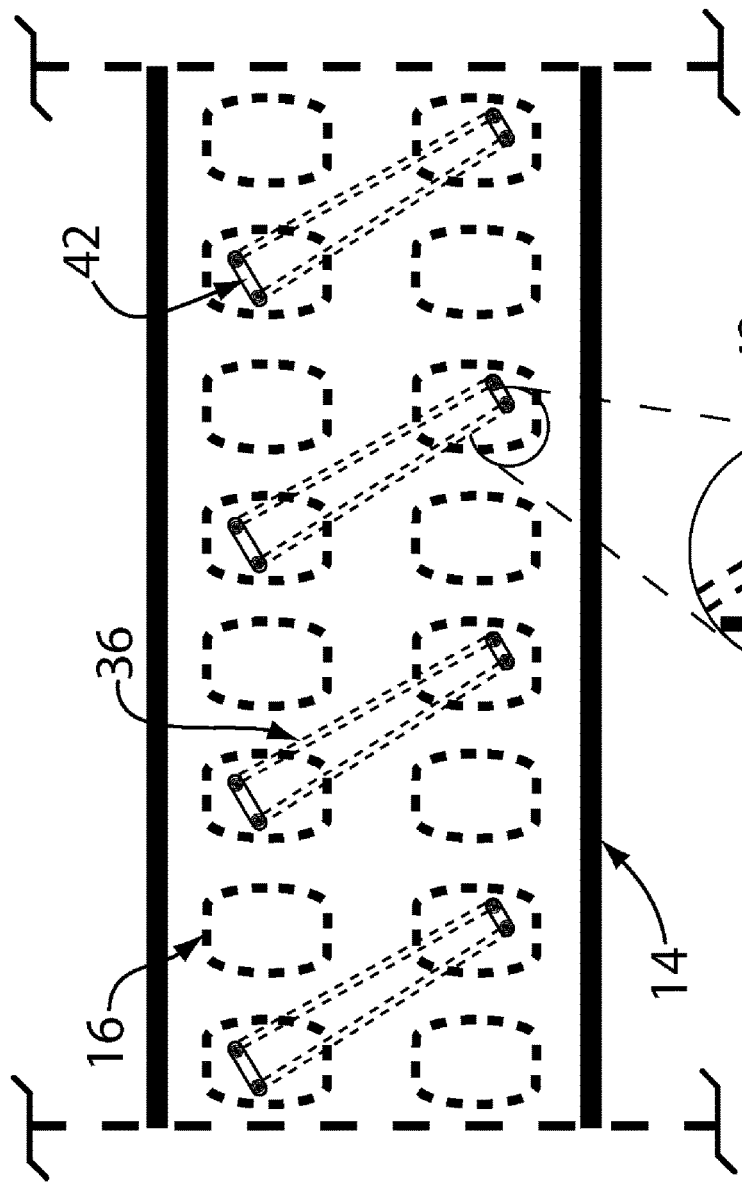
FIG. 7b shows a Bottom view of a Track section with trough attachment hardware.
Figure 7C:
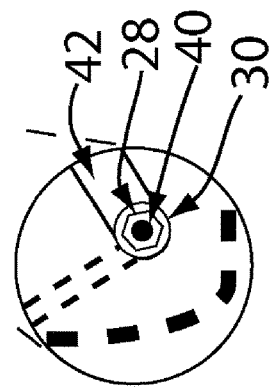
FIG. 7c shows a Closeup view of said hardware.

FIG. 7a shows a top view of a right side track 14 section with angled compression troughs 36 with tapering flanges 38 spanning across the track gap 19 and secured by trough bolts 40 through selected treads 16 as shown. FIG. 7b shows a bottom view of a track 14 section with corresponding trough attachment hardware, with FIG. 7c showing a closeup view of said hardware, namely nuts 28, optional washers 30, and trough plate 42 secured to each trough bolt 40. Hatched lines represent treads 16 and compression troughs 36 from topside of track 14.

The preferred embodiment of the Detachable Traction System for Endless Track Vehicles will now be described in detail. Each complementary aspect of the traction system will be discussed separately as follows:

Gripping Bars:

The functionality of a traction system necessarily requires aspects that improve gripping that match the terrain it is employed upon. In this aspect, an gripping bar 22 is used to increase traction on low friction terrain 46 such as ice & hardened snow. A key aspect of the gripping bar 22 is the creation of a roughened, claw-like protrusive surfacing 24 on the low friction terrain 46 (ice/hard snow) engaging section of the cleat 22. (FIG. 2b) The protrusive surfacing 24 is created by running an irregularly welded carbon steel bead along the top surface of the metal cleat 22, which creates a strong ice crushing and snow gripping protrusion area that bites into ice or compacted snow, thereby improving traction.

An additional aspect of gripping bars 22 is their length and orientation. Studs are singular points of contact with low friction terrain 46, whereas gripping bars 22 are elongated areas of contact with multiple points of gripping contact. Another aspect of gripping bars 22 is their angled orientation (see FIG. 5a) which prevents the tracked vehicle 12 from slipping sideways on low friction terrain 46, or while ascending inclines or uneven terrain. The orientation angle and elongated area of the gripping bars 22 allow the track 14 to grip low friction terrain 46 more reliably than uncleated vehicles 12, and can even marginally improve grip on mixed terrains that include mud/slush.

The gripping bar 22 as shown in FIGS. 2a-c bolts entirely through the track 14 and its tread 16, thereby increasing its securement over prior art studs or removable chains. The gripping bar 22 is secured with two bolts 32 running completely through the track 14, and this provides a strength against being torn out much greater than if a stud was merely mounted part way into the track 14 belt. In addition, a cleat plate 34 can be used in place of washers 30 to secure each gripping bar 22 even more robustly to the track, spreading the torquing forces across a greater area, and thereby ensuring the longevity and utility of this aspect of the traction system.

Compression Troughs:

In this aspect of the detachable traction system, a compression trough 36 is used to increase traction on semi-liquid terrain 48 such as mud & slush. As can be seen in FIGS. 3a & 3c, the bar-like compression trough 36 is unlike the prior art described above, and these aspects are critical to its utility. The compression trough 36 does not have parallel flanges 38 (i.e. sidewalls), and when employed as shown in FIG. 7a with a mirror image orientation for the left track, the unique utility of this aspect of the traction system becomes apparent. Angular orientation of the compression troughs 36 function in a similar way to the angled cleats 22 above, preventing sideways slippage as the vehicle operates on semi-liquid terrain 48. A key aspect of the compression troughs 36 are its tapering flanges 38 as shown in the figures. Unlike ice, where all one needs to do it break into and grip the rigid surface of a low friction terrain 46 to achieve traction, the semi-liquid nature of mud/slush creates a frictionless barrier that prevents traction. Prior art has attempted to solve this problem by using paddle-like bars that may work in one direction, after a fashion, but not reliably when turning or taking inclines.

The compression trough 36 overcomes this issue by temporarily trapping a section of mud/slush between the flanges 38 of the trough 36, which creates the equivalent of an extended track length tread that grips the underlying mud/slush. Instead of mud/slush smearing out as it slides over itself when pushed by a normal track, the compressed mud in compression troughs 36 stick to the mud/slush in the immediate area around each trough 36 and thereby create a temporary adhesion zone as long as the mud/slush is held between the flanges 38 of the trough 36. This solution is unlike the prior art, and enables the operator to navigate semi-liquid terrain safely and reliably without becoming bogged down.

An additional aspect of the compression trough 36 is its tapered flanges 38 as shown in FIG. 7a, with the narrow end towards the inside of the track 14, nearest the vehicle, and the wider end towards the edge of the track 14. FIG. 7a shows a right side track 14, and a mirrored orientation is used for the left side track. By this means mud/slush is temporarily compressed into the compression troughs 36, but as the vehicle 12 moves the mud/slush should be removed from the troughs 36 or it will build up and the vehicle 12 will bog down. The widening of the troughs 36 towards the outside edges of the tracks allows the mud/slush to flow away from the vehicle 12 instead of becoming trapped between the flanges 38 of each trough 36. By this means the troughs 36 allow the vehicle 12 to compress and grip the mud/slush momentarily for traction, and then shed the mud/slush away from its sides to prevent clogging the troughs 36 as it moves. Other embodiments are not ruled out or similar methods leading to the same result.

The preferred materials for constructing said novel traction elements include, but may not be limited to, any metal strong enough to withstand the forces of the terrain, including carbon steel, stainless steel, composites, or any other material that leads to the same performance objectives outlined above.

The foregoing was disclosed in Canadian patent application CA 2881247 filed Feb. 4, 2015 which forms the basis for the (partial) priority claim in the present application. The following supplementary disclosure comprises an alternate mounting system for threads 26 of the cleat bolts 32 of the adhesion cleats 22 and the trough bolts 40 of the compression troughs 36.

BRIEF DESCRIPTION OF SUPPLEMENTARY DRAWINGS

Figure 8A:
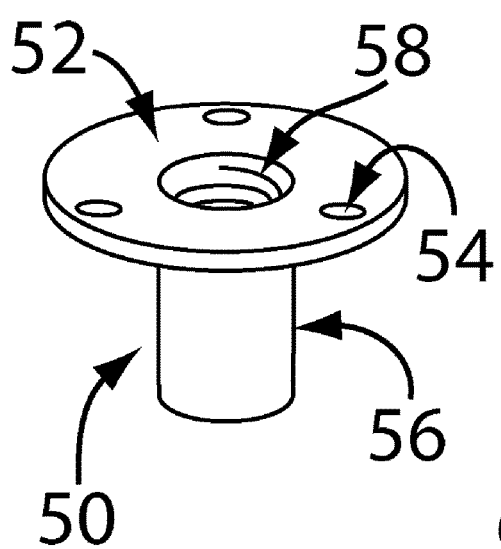
Figure 8B:
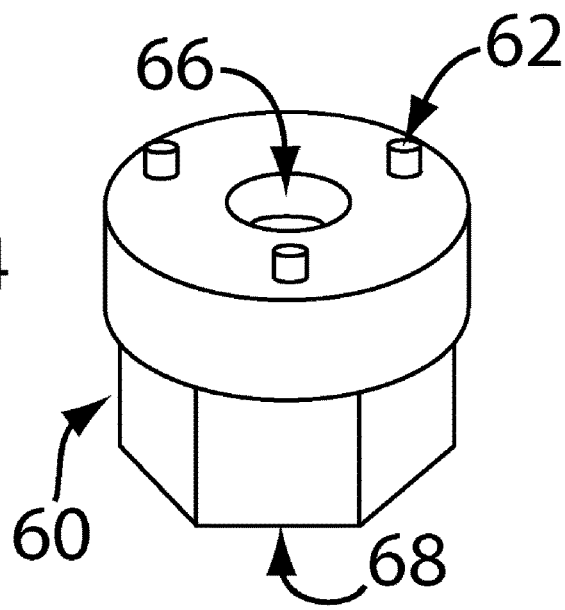
Figure 8C:
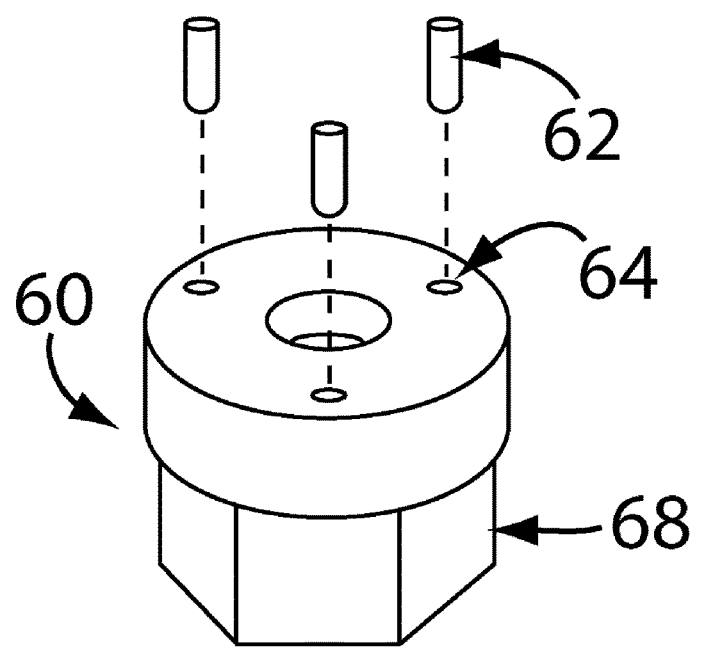

FIG. 8a shows a front isometric view of the flange nut, FIG. 8b the nut driver, and FIG. 8c, flange pin insertion.

Figure 9A:
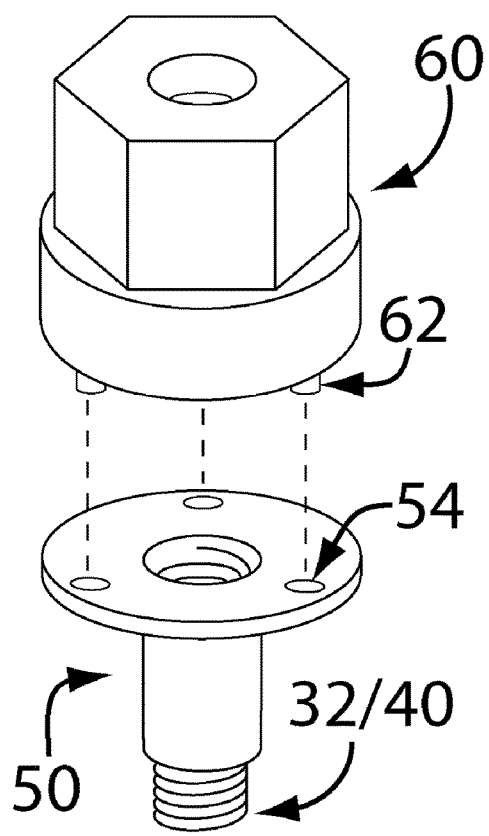
Figure 9B:
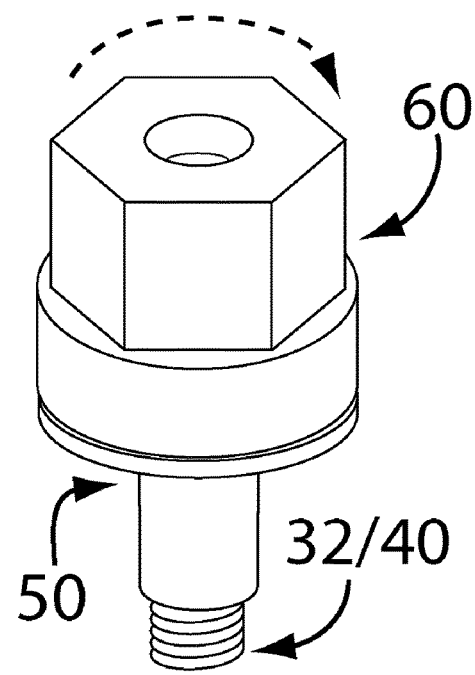

FIG. 9a shows a front isometric view of the nut driver engaging the flange nut, while FIG. 9b shows the driver rotating the flange nut around the threads of either a cleat bolt or a trough bolt.

Figure 10A:
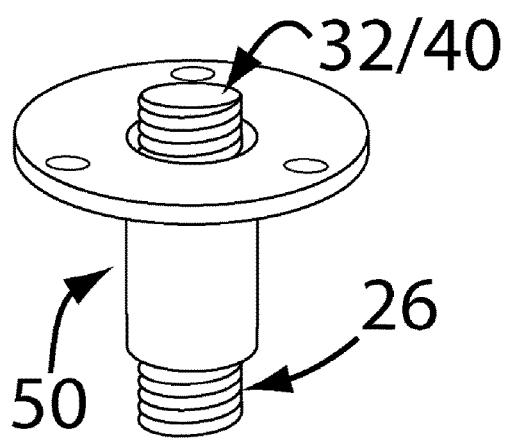
Figure 10B:
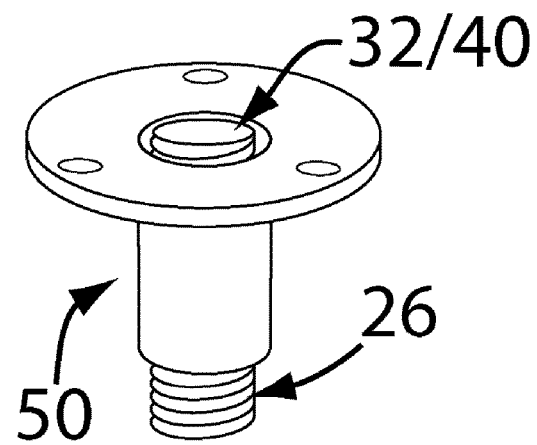
Figure 10C:
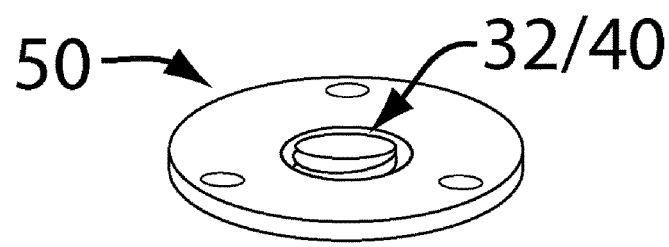

FIG. 10a shows a front isometric view of a threaded flange nut with its exposed bolt end, while FIG. 10b shows the end after trimming FIG. 10c shows how the trimmed flange nut and bolt end would appear on the surface of a track.

FIG. 11 shows a side cutaway view of flange nuts being employed to secure a cleat bolt to a track.

FIG. 12a shows a Top view of a Track section with Mini Cleat/Troughs installed on alternate treads.

FIG. 12b shows a Top view of a Mini Cleat/Trough.

FIG. 12c shows a Side view of a Mini Cleat/Trough installed into the tread of a track.

FIG. 12d shows the End view of a Mini Cleat/Trough with an adhesion cleat used as a securement means as well as a concurrent traction functionality.

SUPPLEMENTARY DISCLOSURE DETAILED DESCRIPTION

This supplementary submission comprises combined traction elements directly derived from the prior related disclosure regarding the use of both adhesion cleats and compression troughs as a dual use unit to provide advantages of both traction solutions on terrains which require multiple options.

As can be seen in FIG. 2a in the previous disclosure, the use of self locking nuts 28 and washers 30 present problems during use and deployment of the traction system. Because the mounting method is exposed, i.e. not flush to the surface of the (treads of the) track 14, it can snag debris during use which can cause cleats 22 or troughs 36 to work loose due to the abrasion of the bolt threads 26 on the inside of the rubber mounting hole 44. This wear can also be caused by continuous flexing of said holes as the track 14 is rotated around the wheels of the drive assembly 20.

These problems are solved by the use of a flange nut 50 instead of nuts 28 and washers 30, as shown in FIG. 8a. Flange nuts 50 are secured to bolt ends (32/40) by means of a special tool for this purpose, namely a nut driver 60, as shown in FIG. 8b.

FIG. 8a includes the flange nut 50, with its flange 52 and pin holes 54, a bolt sheath 56 with internal nut threading 58. FIG. 8b includes the nut driver 60 with its flange pins 62, a bolt tube 66 (to receive the protruding end of a bolt as it is threaded), and the driven end 68 (hexagonal to fit a common socket). While the nut driver may be machined entirely, including the flange pins 62, FIG. 8c shows an alternate option whereby flange pins 62 are inserted into pin receivers 64, thereby simplifying the manufacturing process and potential repair costs if the pins should break. FIG. 9a shows how the flange pins 62 of the nut driver 60 seat into the pin holes 54 of the flange nut 50, thereby allowing rotation of the nut 50 onto a bolt 32/40 by means of the tool 60, as shown by the broken arrow in FIG. 9b.

FIG. 10a shows the flange nut 50 after threading, with some remainder of exposed bolt 32/40. FIG. 10b shows the exposed bolt 32/40 after being trimmed (by angle grinder or similar) such that the resulting threaded nut is flush with the surface of a track, as shown in FIG. 10c. The remaining flange nut 50 and its trimmed bolt 32/40 integrate with the track and provide clamping and additional strength of attachment compared to using an unflanged nut. The flanged nut being flush with the surface of the material to which it is mounted and its bolt being trimmed enables use on a great variety of tracked vehicles, including those that have rollers or tires around which a track may be mounted, which would not operate satisfactorily if the flanged nut and bolt were protruding between the track and a roller or tire. The exposed bolts in the flange nuts are trimmed such that the flange nuts are flush with the surface of a track, in order to allow rollers or tires within the track to run over the flange nut surface without damaging the rollers or tires. When the bolts are trimmed and the flange nuts are flush with the inner surface of the track, there is still pressure on and vibration transmitted to the flange nuts from the rollers or tires within the track, which assists in shaking clogged mud or snow from the Mini-Cleat Troughs.

FIG. 11 is similar to FIG. 2a, but in this case the flange nut 50 mounting method is shown resulting in flanges 52 that are flush with the track 14 and with bolts 32 that do not abrade the inside of the mounting hole 44.

A combined Cleat/Trough embodiment provides more versatile traction options, enabled by the use of reduced flange height, a shorter trough length, the use of a single cleat to secure the trough to a tread (reducing parts), and allowing both flanges & cleats to contact the terrain surface simultaneously. By this means, the machine operator has dual use capabilities and improved traction on both low friction terrain (ice & snow & oily asphalt) and semi-liquid terrain (mud & sand) without needing to stop and change traction systems.

FIG. 12a shows a top view of a right track 14 section with Mini Cleat/Troughs 70 installed on alternate treads 16. Each Mini Cleat/Trough 70 includes shortened mini (side) flanges 72 as described below.

FIG. 12b shows a top closeup view of a Mini Cleat/Trough 70 with an adhesion cleat 22 inserted through cleat mounting holes 74 at the bottom of the trough between its flanged sides 72.

FIG. 12c shows a side view of a Mini Cleat/Trough 70 installed into the tread 16 of a track 14 with the bolts 32 of the adhesion cleat 22 used to secure the mini trough 70 to the track 14. In addition, the height of both the cleat 22 and the mini trough flanges is designed so that the adhesion surfacing 24 of the cleat 22 always just clears the top of the flanges 72.

FIG. 12d shows an end view of a Mini Cleat/Trough 70 with an adhesion cleat 22 inserted through the trough's cleat mounting holes 74 to enable securement, as well as provide concurrent traction functionality.

Materials and methods used to construct the Mini-cleat are the same as those described in the primary disclosure. Materials used for flange nuts and nut driver include, but are not limited to, rust resistant steel that is strong enough to reliably secure cleat of trough bolts to the treads of a track which is constantly moving through low friction (icy) or semi-liquid (muddy) terrain.

The resulting mounting system ensures improved securement of the detachable traction system to the vehicle tracks, less likelihood of debris accumulation due to protruding mounting nuts, and prevention of internal abrasion of mounting holes which can lead to cleat and trough movement and potential unwanted traction system detachment.

The foregoing description of the preferred apparatus and method of installation should be considered as illustrative only, and not limiting. Other forming techniques and other materials may be employed towards similar ends. Various changes and modifications will occur to those skilled in the art, without departing from the true scope of the invention as defined in the above disclosure, and the following general claims.

The invention claimed is:

1. A detachable traction system for track vehicles comprising a multiplicity of rigid gripping bars each of which includes a pair of bolts integrally formed with and extending therefrom adapted to be passed through a tread of a corresponding multiplicity of treads on each track of an endless track vehicle wherein each bolt of said pair of bolts includes a nut for securing each of said pair of bolts to the track wherein said rigid gripping bars are located to an exterior of said track and said nuts are located to an interior of said track.

2. The detachable traction system of claim 1, in which each of the gripping bars extends perpendicularly at each end thereof into the bolts mounted through holes in the treads, secured therein with the nuts screwed onto the bolts.

3. The detachable traction system of claim 2, comprising a first plurality of gripping bars each have a gripping surface comprising a patch of durable rough protrusive material, and a second plurality of gripping bars each having compression troughs formed by flanges perpendicular to a bar base.

4. The detachable traction system of claim 3, in which each compression trough of the second plurality of gripping bars is tapered from a narrow-trough end of a gripping bar base to a wider trough end of the gripping bar base.

5. The detachable traction system of claim 4, in which the gripping bars on a first track of the vehicle are mounted at an angle to an edge of each tread of the first track, and the gripping bars on a second track of the vehicle are mounted at a mirror-image angle to an edge of each tread on the second track.

6. The detachable traction system of claim 5, in which gripping bars each having a gripping surface comprising a patch of durable rough protrusive material alternate with gripping bars each having a compression trough, forming a pattern of gripping bars mounted to each track of the vehicle.

7. The detachable traction system of claim 6, in which the gripping bars having compression troughs each extend perpendicularly into the pair of bolts at each end of a bar base of the respective gripping bar, each such bolt being mounted through the holes in the treads and secured therein with the nuts screwed onto the bolts.

8. The detachable traction system of claim 2, in which the nuts are flange nuts.

9. The detachable traction system of claim 8, in which the flange nuts each have pin holes to fit a flange nut driver tool having flange pins and a bolt tube to receive a protruding end of a bolt.

10. The detachable traction system of claim 8, in which exposed ends of the bolts in the flange nuts are trimmed such that the flange nuts are flush with an inside surface of each track, in order to allow rollers or tires within the track to run over the flange nut without damaging the rollers or tires.

11. The detachable traction system of claim 10, in which a cleat secures a compression trough to the tread.

12. The detachable traction system of claim 10, in which the compression trough and securing cleats are of substantially like height in order to allow adhesion surfacing on the compression trough to just clear the top of flanges on the compression trough.

13. The detachable traction system of claim 1, in which a plurality of the gripping bars each have a gripping surface comprising a patch of durable rough protrusive material.

14. The detachable traction system of claim 1, in which a plurality of the gripping bars each have compression troughs formed by flanges perpendicular to a bar base of each such gripping bar.

15. The detachable traction system of claim 14, in which the compression troughs are tapered from a narrow-trough end of a bar base of each compression trough to a wider-trough end of the bar base of the compression trough.

16. The detachable traction system of claim 14, in which the gripping bars each extend perpendicularly into the pair of bolts at each end of the bar base of the respective gripping bar, each such bolt being mounted through holes in the treads and secured therein with the nuts screwed onto the bolts.

17. The detachable traction system of claim 1, in which the gripping bars on a first track of the vehicle are mounted at an angle to an edge of each tread of the first track, and the gripping bars on a second track of the vehicle are mounted at a mirror-image angle to an edge of each tread on the second track.

18. The detachable traction system of claim 1, in which a combination of gripping bars having a gripping surface comprising patches of durable rough protrusive material, and of gripping bars having compression troughs, are mounted to the tracks of the vehicle.

19. The detachable traction system of claim 18, in which gripping bars having gripping surfaces comprising patches of durable rough protrusive material alternate with gripping bars having compression troughs to form a pattern of gripping bars mounted on the treads of each track of the vehicle.

\* \* \* \* \*